United States Patent [19]

Moran et al.

[11] 4,290,581
[45] Sep. 22, 1981

[54] SEAT ASSEMBLY FOR BALL VALVES

[75] Inventors: George A. Moran; John B. Williams, both of Houston, Tex.

[73] Assignee: ACF Industries, Incorporated, New York, N.Y.

[21] Appl. No.: 77,695

[22] Filed: Sep. 21, 1979

[51] Int. Cl.³ .............................................. F16K 25/00
[52] U.S. Cl. .................................... 251/172; 251/174; 251/362; 251/368
[58] Field of Search ............... 251/171, 174, 172, 173, 251/306, 362, 368, 315; 277/26, 27

[56] References Cited

U.S. PATENT DOCUMENTS

| | | | |
|---|---|---|---|
| 2,777,664 | 1/1957 | Bryant | 251/174 |
| 3,073,566 | 1/1963 | Bredtschneider | 251/362 |
| 3,266,769 | 8/1966 | Shand | 251/172 |
| 3,460,843 | 8/1969 | Jaeger | 277/26 |
| 3,472,270 | 10/1969 | Masheder | 251/174 X |
| 3,511,471 | 5/1970 | Rossi | 251/368 X |
| 3,521,855 | 7/1970 | Jensen | 251/172 |
| 3,559,662 | 2/1971 | Iezzi | 251/368 X |
| 3,842,861 | 10/1974 | Jandrasi | 251/172 X |
| 3,945,607 | 3/1976 | Dashner | 251/362 X |

FOREIGN PATENT DOCUMENTS

| | | | |
|---|---|---|---|
| 162475 | 3/1949 | Fed. Rep. of Germany | 251/174 |
| 1650611 | 7/1973 | Fed. Rep. of Germany | 251/172 |

Primary Examiner—Harold W. Weakley
Attorney, Agent, or Firm—Eugene N. Riddle; Stephen T. Belsheim

[57] ABSTRACT

A ball valve having a seat assembly (46) in the form of a flexible metal holder (52) which carries a resin impregnated graphite face seal (54) contacting the ball (28). Flexibility of the holder is provided by a leg (58) thereof which terminates in a free end having an annular lip (62) in sealing contact with the valve body. In a modified arrangement, the upstream seat has an annular space exposed to the upstream flow passage in order to increase the sealing force, while a corresponding annular space of the downstream seat is exposed to the valve chamber to increase its sealing force when the body pressure exceeds the downstream pressure.

4 Claims, 5 Drawing Figures

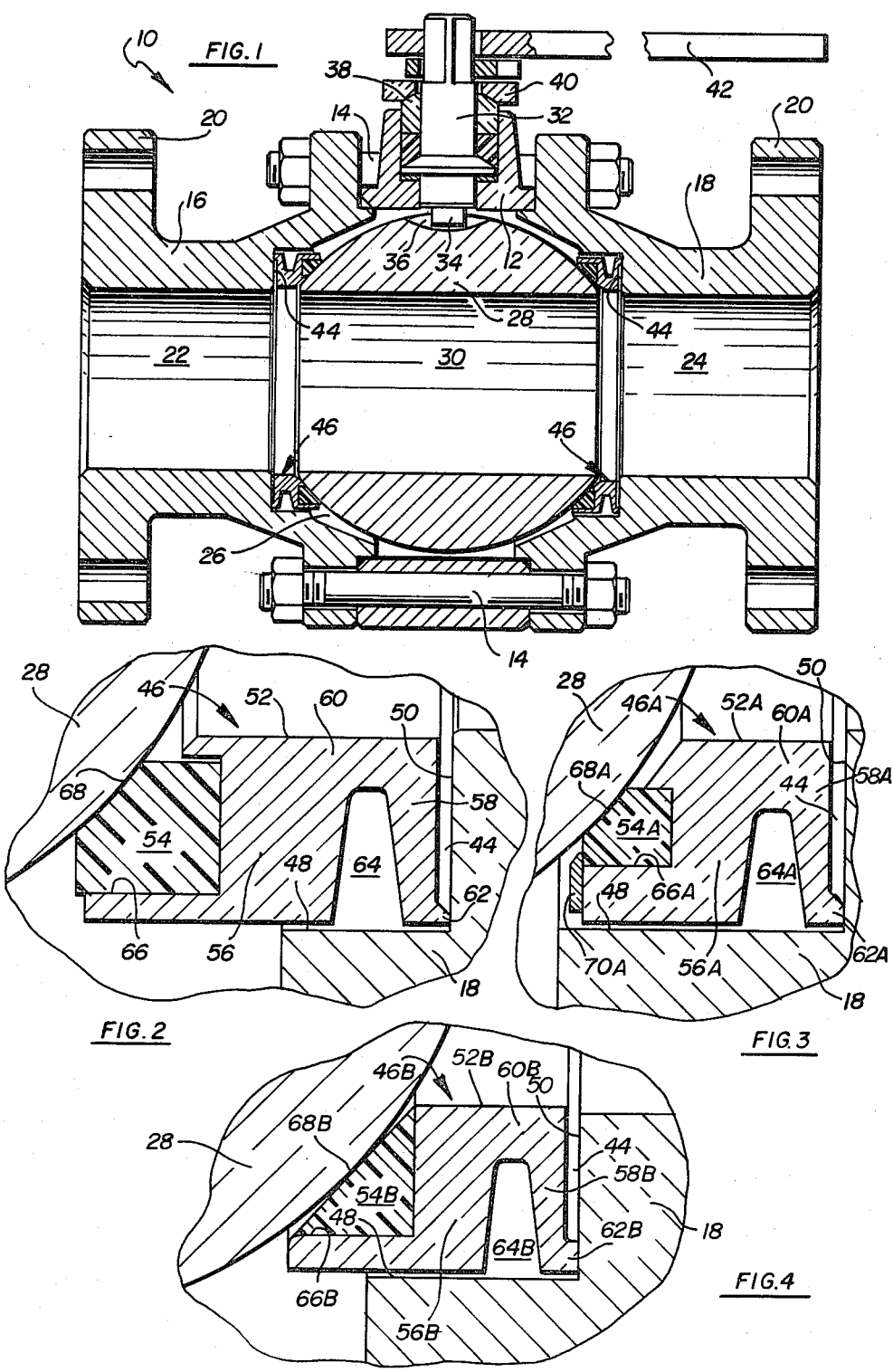

SEAT ASSEMBLY FOR BALL VALVES

BACKGROUND OF THE INVENTION

This invention relates generally to valves and deals more particularly with a ball valve having an improved seat assembly.

Conventional ball valves are equipped with metal valve seats which carry relatively soft face seals or inserts for sealing engagement with the metal ball. The face seal is typically an elastomer or a similar substance which is able to compensate for irregularities in the ball while at the same time minimizing frictional forces in order to avoid excessive operating torque. "Teflon" materials or other plastic substances are most often used for the face seal due to their desirable sealing characteristics and their low coefficient of friction when contacting metal. Although materials of this type function well at ambient temperatures, they lose much of their effectiveness at elevated temperatures and are thus unsatisfactory of high temperature service. Fire completely destroys face seals constructed of "Teflon" or any of the similar materials that are in widespread use. In addition, these substances are susceptible to rapid wear and other damage which decreases their useful life.

Preloading of conventional ball valve seats is normally accomplished by a spring which adds to the expense and complexity of the seat assembly and significantly increases the maintenance requirements. Further problems result from the need to seal the seat to the valve body, a function usually accomplished by an O-ring or another type of seal element. It has also been necessary to secure the face seal in place on the valve seat by means of glue, clamps or other fastening devices which further add to the complexity and assembly difficulties.

SUMMARY OF THE INVENTION

The present invention is directed to a ball valve having an improved seat assembly which overcomes the aforementioned problems. In accordance with the invention, a metal holder is mounted in an annular seat pocket and carries a resin impregnated graphite face seal which forms an effective seal against the ball. A flexible leg of the metal holder terminates in an annular lip which provides a metal-to-metal seal with the valve body. The flexibility of the leg permits the seat to be preloaded for initial sealing of the graphite face seal and also compensates for irregularities and manufacturing tolerances in the various components. The graphite-metal interface has a relatively low coefficient of friction which provides a low operating torque, while the graphite is able to intimately contact the metal ball for effective sealing therewith even when surface irregularities and other imperfections are present. Because of the ability of graphite to withstand temperatures up to 1000° F. and more, the valve is well adapted for both ambient and high temperature service. The face seal is mounted in an annular groove of the holder in a heat shrink fit which prevents the brittle graphite from being subjected to damaging tension forces in high temperature service where thermal expansion of the metal holder occurs. A modified form of the invention utilizes the upstream pressure to enhance the upstream seal and the body pressure to enhance the downstream seal.

DETAILED DESCRIPTION OF THE INVENTION

In the accompanying drawings which form a part of the specification and are to be read in conjunction therewith:

FIG. 1 is a sectional view of a ball valve which is equipped with a pair of seat assemblies constructed in accordance with a preferred embodiment of the present invention, the valve being shown in the open position;

FIG. 2 is a fragmentary sectional view on an enlarged scale illustrating the details of one of the seat assemblies shown in FIG. 1;

FIG. 3 is a fragmentary sectional view similar to FIG. 2, but showing a modified seat assembly constructed in accordance with a second embodiment;

FIG. 4 is a fragmentary sectional view similar to FIGS. 2 and 3 and showing another modified seat assembly constructed in accorddance with a third embodiment of the invention.

Figure 5:
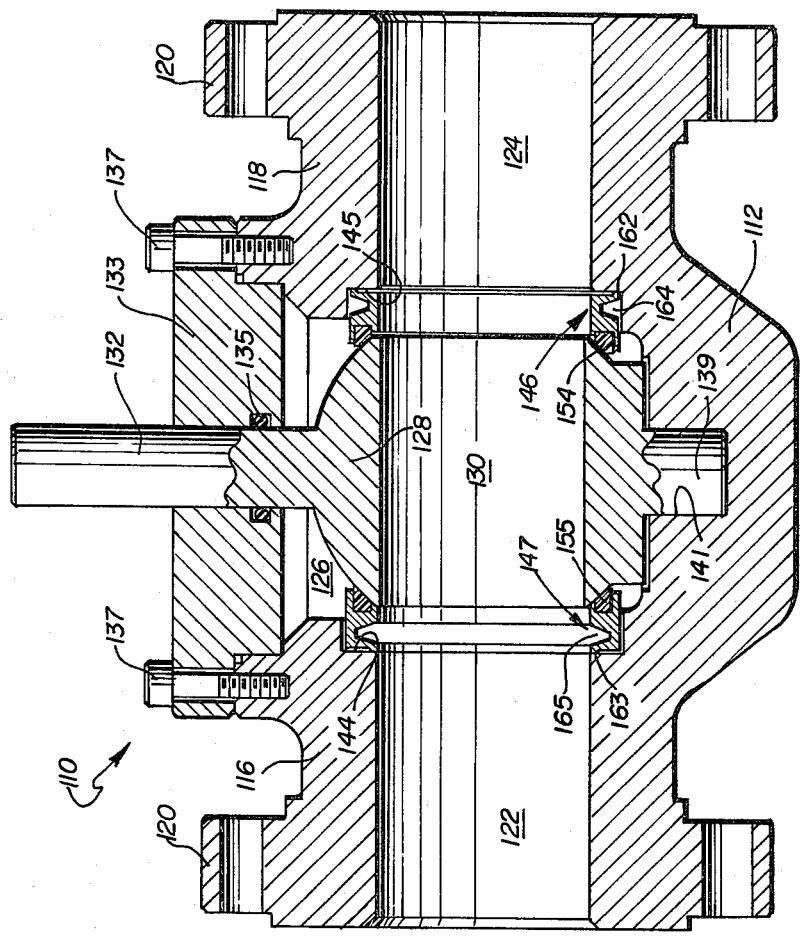
FIG. 5 is a sectional view of a ball valve which is equipped with a pair of seat assemblies arranged in accordance with a modified form of the invention, the valve being shown in the open position.

Referring now to the drawing in detail and initially to FIG. 1, reference numeral 10 generally designates a ball valve which is connected for use in both ambient and high temperature service. The body of valve 10 includes a central annular casing 12 which is secured by bolts 14 between a pair of tail pieces 16 and 18. Flanges 20 are formed on the outer ends of the tail pieces to permit the valve to be bolted in a flowline (not shown). An inlet passage 22 is formed in tail piece 16, and an aligned outlet passage 24 is formed in tail piece 18. A valve chamber 26 is formed between passages 22 and 24 and receives a rotatable ball 28 having a port 30 which aligns with passages 22 and 24 when the ball is in the open position shown in FIG. 1.

Ball 28 is rotated by an operating stem 32 having a tongue portion 34 on its lower end which is received within a notch 36 formed in ball 28. The fit of tongue 34 in notch 36 permits ball 28 to "float" to a limited extent when a pressure differential exists across the ball. Stem 32 is sealed to the valve body by a stem packing 38 which is held in place by a retainer 40. The top end of stem 32 receives a handle 42 which is used to rotate the stem and ball between the open and closed positions of the valve. In the closed position, ball 28 blocks fluid between passages 22 and 24.

An annular seat pocket 44 is formed around each flow passage 22 and 24 at a location adjacent valve chamber 26. Each seat pocket 44 receives an annular seat assembly generally designated by reference numeral 46. Since each seat assembly 46 is constructed identically, only one of the seat assemblies will be described in detail.

With particular reference to FIG. 2, each of the seat pockets 44 is bounded by an outer cylindrical surface 48 which is concentric with and spaced outwardly of the corresponding flow passage. A flat annular shoulder 50 extends between surface 48 and the flow passage to provide an inwardly facing surface defining the outer boundary of the seat pocket. Each seat assembly 46 includes an annular metal carrier or holder 52 which carries a hard graphite insert or face seal 54. Each holder 52 includes a main body portion 56 and a leg portion 58 which is connected at one end with body portion 56 by a short cylinder portion 60 of the holder. Cylinder portion 60 is located on the inside of holder 52, with leg portion 58 extending outwardly therefrom and terminating in a free end located adjacent the outside of the holder. An annular lip 62 is formed on the free end of leg portion 58 and is disposed in sealing contact with shoulder 50 at an outer portion thereof adjacent the outer surface 48. Lip 62 forms a fluid-tight metal-to-metal seal between seat assembly 46 and the valve body.

Leg portion 58 is separated from main body portion 56 by an annular space 64 which has a tapered profile from the outside to the inside thereof. Leg portion 58 is thus flexible relative to body portion 56 to provide holder 52 with a flexible construction, the tapered configuration of space 64 adding to the flexibility without detracting from the strength. Leg 58 is spaced from shoulder 50. Holder 52 is spaced slightly inwardly of surface 48 to permit the fluid in valve chamber 26 to flow into space 64 for urging of body portion 56 toward ball 28.

The surface of body portion 56 which confronts ball 28 is provided with an annular groove 66 which receives face seal 54. The face seal is formed of hard graphite which is impregnated with a resinous substance in order to minimize the porosity of the graphite. Face seal 54 projects beyond body portion 56 and has a machined surface 68 which contacts ball 28 in sealing relation thereto to provide a seal between seat assembly 46 and ball 28.

Face seal 54 is an annular ring member which is preferably mounted in groove 66 in a heat shrink fit therein. To carry out the heat shrink operation, holder 52 is heated to a temperature well above the maximum service temperature of the valve, and face seal 54 is inserted in groove 66 at the elevated temperature. When the metal holder 52 is subsequently cooled, it contracts due to the lowering of the temperature such that face seal 54 is tightly compressed in groove 66 and held therein by the heat shrink fit. Since graphite is strong in compression, it is firmly held in place in groove 66 without the need for glue, clamps or other fastening devices. In addition, when holder 52 is subsequently heated to elevated temperatures during service, the thermal expansion of the metal holder does not subject the brittle graphite to excessive tension forces which could damage it.

In use, seat assembly 46 is effectively sealed to the valve body by lip 62 and to ball 28 by the resin impregnated graphite face seal 54. Upon assembly of the valve, lip 62 is positioned against shoulder 50 and body portion 56 is flexed toward leg portion 58 such that the seat assembly is preloaded to provide an initial seal between ball 28 and face seal 54. The graphite face seal 54 is soft enough to effectively seal against ball 28 even when the ball has surface irregularities and other imperfections. In addition, the interface between the graphite face seal 54 and the metal ball 28 develops low frictional forces which minimize the operating torque of the valve and permit it to be easily turned between the open and closed positions. The mating graphite and metal surfaces are resistant to galling, wear and other damage or deterioration.

The flexibility of leg portion 58 permits preloading of the valve seat and also maintains lip 62 in firm sealing contact with shoulder 50 while at the same time compensating for wear and for manufacturing tolerances and inaccuracies. Since the seat load is proportional to the pressure differential across ball 28, a pressure energized seal is provided for the floating ball construction. It is to be noted, however, that the seat assemblies are also useful in a trunnion type ball valve wherein the ball is not permitted to float in response to fluid pressure.

The metal and graphite materials of seat assemblies 46 are well suited for both ambient and high temperature service. The graphite face seal 54 is able to effectively seal against ball 28 at temperatures up to 1000° F. and more, while te graphite is also resistant to fire. At high temperatures causing thermal expansion of the metal holder 52, graphite face seal 54 remains loaded in compression due to the heat shrink fit of the face seal in groove 66. Consequently, damaging tension forces are not applied to the brittle graphite even during high temperature service.

FIG. 3 illustrates a modified seat assembly 46A which is constructed similarly to seat assembly 46. The portions of seat assembly 46A are essentially the same as the corresponding portions of seat assembly 46 and are designated by the same reference numerals, with the numerals employed in FIG. 3 being followed by reference letter "A". Metal holder 52A has a body portion 56A which is slightly smaller than body portion 56, with the remainder of the holder being substantially identical to that described in connection with FIG. 2. Body portion 56A has a relatively small annular groove 66A which receives a resin impregnated graphite face seal 54A which is somewhat smaller than face seal 54.

The major difference between seat assemblies 46A and 46 is the attachment of a metal ring 70 to holder 52A for holding face seal 54A in place and protecting the lip of holder 52A. Ring 70 is secured by adhesive or any other suitable means to the inside surface of body portion 56A at a location outside of and adjacent to groove 66A. Ring 70 extends beyond the edge of groove 66A and contacts face seal 54A in order to assist in holding the face seal in place within groove 66A. In addition, ring 70 serves to protect the adjacent lip of holder 52A. Seat assembly 46A functions in the same manner as described for seat assembly 46.

FIG. 4 illustrates yet another seat assembly 46B which is constructed similarly to seat assemblies 46 and 46A. The same reference characters are employed in FIG. 4 as were employed in FIG. 2, with the numerals in FIG. 4 being followed by reference character "B". Body portion 56B of metal holder 52B is somewhat smaller than body portion 56 and is provided with an annular groove 66B which is triangular in section. A resin impregnated hard graphite face seal 54B is mounted in groove 66B, preferably in a heat shrink fit therein such that the outer portion of holder 52B applies a compressive load to face seal 54B even when the valve is used in high temperature service. Face seal 54B is a ring member which is triangular in section and which has substantially line contact with ball 28, as indicated at 68B. Seat assembly 46B functions in essentially the same manner as seat assembly 46.

In each embodiment of the invention, the desirable sealing and frictional properties of resin impregnated graphite are employed in combination with a flexible metal holder having an annular lip which provides a metal-to-metal seal with the valve body. All embodiments of the invention are thus well adapted for both ambient and high temperature service without requiring an unduly complex arrangement of parts or a large number of components in the seat assembly.

FIG. 5 illustrates a trunnion-type ball valve 110 having a valve body 112 with integral opposite end portions 116 and 118 within which aligned upstream and downstream flow passages 122 and 124 are formed to provide a fluid flow passageway through the valve body. Flanges 120 are formed on opposite ends of valve body 112. A valve chamber 126 is formed in body 112 between passages 122 and 124 to receive a ball 128 having a part 130 which aligns with passages 122 and 124 when ball 128 is rotated to the open position shown in FIG. 5. Ball 128 has an operating stem 132 which extends through a cover plate 133 and is sealed thereto by an O-ring 135. Valve 10 is a top entry ball valve, and plate 133 is mounted to body 112 by bolts 137 which may be removed to permit removal of plate 133 for access to the internal components of the valve. A handle (not shown) may be secured to stem 132 to facilitate rotation of ball 128 between the open position shown in FIG. 5 and a closed position wherein ball 128 blocks flow from upstream passage 122 to downstream passage 124. A stub-like lower stem 139 extends downwardly from ball 128 and is received in a suitable recess 141 in body 12 to provide a trunnion mounting arrangement for ball 128 which resists the tendency of the ball to "float" downstream under the influence of a pressure differential between the upstream and downstream flow passages.

Upstream flow passage 122 has an annular seat pocket 144, and downstream passage 124 has a seat pocket 145, each seat pocket 144 and 145 being identical to the seat pockets 44 described previously. Mounted in downstream pocket 145 is a downstream seat assembly 146 which is identical to the seat assembly 46 shown in FIG. 2. Seat assembly 146 has an annular sealing lip 162 corresponding to lip 62 and sealing against valve body 112 at an outer portion of seat pocket 145. An annular space 164 corresponding to space 64 opens to valve chamber 126 and is thus exposed to the fluid pressure in the valve chamber. A resin impregnated graphite face seal 154 seals against ball 128.

Mounted in upstream seat pocket 144 is an upstream seat assembly 147 which is constructed similarly to seat assembly 46 but arranged in an opposite orientation with respect to the adjacent flow passage and valve chamber. Seat assembly has a resin impregnated graphite face seal 155 and a flexible leg which terminates in an annular lip 163. Lip 163 contacts the adjacent shoulder of seat pocket 144 at an inner portion thereof adjacent to flow passage 122. An annular space 165 corresponding to space 64 is formed between the leg and body portions of the seat member but opens to the adjacent upstream flow passage 122 rather than to the valve chamber as is the case with space 164.

In use, ball 128 is rotated between the open and closed positions to control fluid flow through valve 110. In the closed position, the upstream pressure in passage 122 is greater than the pressure in valve chamber 126, and the high pressure in passage 122 enters space 165 to urge face seal 155 against ball 128 and to urge lip 163 against valve body 112 due to the spreading action applied by the fluid pressure tending to spread apart the leg and body portions of the seat member. Accordingly, an effective upstream seal is provided. If fluid should be present in valve chamber 126 in the closed position of ball 128, such pressure will enter space 164 of the downstream seat assembly 146. When the downstream pressure in flow passage 124 is less than the valve chamber pressure, the pressure in space 164 tends to spread apart the leg and body portions of the downstream valve seat, thus increasing the force of face seal 154 against the ball and lip 162 against the valve body. As a result, the fluid in valve chamber 126 is unable to leak into the downstream flow passage.

It is thus apparent that the construction and arrangement of the seat assemblies 146 and 147 is such that leakage of fluid is impeded even under high pressure service. In addition, the favorable characteristics of graphite and metal are combined in the seat construction. It should be noted that the graphite face seals seal against the ball member along a considerable surface thereof, as shown at 68 in FIG. 2. A seal is thus effected near both the inside and outside portions of the seat. Therefore, in the FIG. 5 embodiment, the fluid pressure acting in spaces 164 and 165 takes advantage of substantial leverage which facilitates spreading the seat members apart, since the high pressure acting against or resisting the spreading force cannot act beyond the point at which the face seal seals against the ball member. Although the seat arrangement shown in FIG. 5 is employed most advantageously in a trunnion type ball valve in which the ball does not "float" downstream under the influence of fluid pressure, it is to be understood that it may also be employed in other types of valves in some situations.

What is claimed is:
1. A valve comprising:
a valve body presenting a valve chamber and upstream and downstream flow passages on opposite sides of said valve chamber;
a valve member mounted in said valve chamber for opening and closing movement to open and close the valve to flow from the upstream to the downstream flow passage;
upstream and downstream seat pockets formed about the respective upstream and downstream flow passages adjacent the valve chamber, each seat pocket presenting a shoulder spaced from and facing generally toward the valve member;
an annular upstream valve seat mounted in said upstream seat pocket, said upstream seat including a body portion confronting the valve member for sealing therewith and a leg portion extending away from said body portion into sealing contact with said shoulder of the upstream seat pocket, said body and leg portions being flexible relative to one another, said annular upstream seat having a single annular groove about its inner peripheral surface separating said body and leg portions and having a cylindrical outer peripheral surface, said annular groove being exposed to said upstream flow passage for receiving pressure therefrom to spread the body and leg portions apart against the valve member and upstream shoulder when the upstream pressure exceeds the valve chamber pressure; and
an annular downstream valve seat mounted in said downstream seat pocket, said downstream seat including a body portion confronting the valve member for sealing therewith and a leg portion extending away from the body portion into sealing contact with said shoulder of the downstream seat pocket, said body and leg portions of the downstream seat being flexible relative to one another, said annular downstream seat having a single annular groove about its outer peripheral surface separating said body and leg portions and having a cylindrical inner peripheral surface, said annular groove being exposed to said valve chamber for receiving pressure therefrom to spread apart the body and leg portions of said downstream seat against the valve member and downstream shoul- der when the valve chamber pressure exceeds the downstream pressure.

2. A valve as set forth in claim 1, wherein each leg portion terminates in a free end having an annular lip thereon in sealing contact with the corresponding shoulder.

3. A valve as set forth in claim 2, wherein said lip of the upstream valve seat contacts the upstream shoulder at an inner portion thereof in proximity to the upstream flow passage, said lip of the downstream valve seat contacting the downstream shoulder at an outer portion thereof spaced outwardly of the downstream flow passage.

4. A valve as set forth in claim 1, including an annular face seal carried on each body portion for sealing contact with the valve member, each face seal comprising resin impregnated graphite.

* * * * *